Patented July 12, 1932

1,867,058

UNITED STATES PATENT OFFICE

HANS BUCHLOH, OF LEVERKUSEN-ON-THE-RHINE, WALTER MIEG, OF OPLADEN, AND WALTHER STOETZER, OF LEVERKUSEN-ON-THE-RHINE, GERMANY, ASSIGNORS TO GENERAL ANILINE WORKS, INC., OF NEW YORK, N. Y., A CORPORATION OF DELAWARE

PROCESS OF PREPARING MONOBENZOYLDIAMINO-ANTHRAQUINONES

No Drawing. Original application filed November 21, 1928, Serial No. 321,034, and in Germany August 30, 1928. Divided and this application filed March 13, 1930. Serial No. 435,630.

The present invention relates to a process of preparing monobenzoyl diamino-anthraquinones, more particularly to compounds of the probable formula:

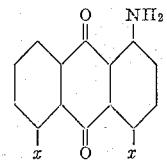

wherein one $x$ stands for hydrogen and the other $x$ stands for the group $NH.CO.C_6H_5$.

In accordance with the invention 1-benzoylamino-4-aminoanthraquinone and 1-benzoylamino-5-aminoanthraquinone are obtainable in a convenient manner and in a good yield, by heating the corresponding diaminoanthraquinones in the presence of an acid binding agent and of a suitable high boiling organic solvent being inert to the starting materials, such as nitrobenzene, ortho-dichlorobenzene, trichlorobenzene and the like, with benzoylchloride in a quantity corresponding to about 120–140% of the theoretical amount. As acid binding agents suitable for performing our process alkali metal carbonates, magnesium oxide, calcium oxide, pyridine and its homologues, quinoline and the like may be mentioned by way of example, from which in the case of 1.5-diamino-anthraquinone alkali metal carbonates, especially sodium carbonate, in the case of 1.4-diaminoanthraquinone sodium carbonate, pyridine or a homologue thereof will yield the best results.

The temperatures to be used may vary in wide limits, mainly depending on the kind of diaminoanthraquinone and an acid binding agent applied. For instance, when working with 1.5-diaminoanthraquinone in the presence of sodium carbonate, temperatures of about 140–180° C. will be suitable, whereas when replacing the 1.5-diaminoanthraquinone by 1.4-diaminoanthraquinone temperatures between about 10–50° C. will yield better results.

The reaction is advantageously performed by dissolving or distributing the diaminoanthraquinone in the organic solvent, adding the acid binding medium in an amount at least sufficient to bind all of the hydrochloric acid being liberated during the reaction, and then causing the benzoyl chloride to run in slowly while stirring and while heating the mixture to the temperatures above mentioned.

The working up of the reaction products differs according to the diaminoanthraquinones used as starting materials. When starting, for instance, with 1.4-diaminoanthraquinone, the reaction proceeds so smoothly, that without further treatment a technically valuable product results. In the case of 1.5-diaminoanthraquinone a fractional separation of the reaction product is necessary. In this case an addition of an aliphatic alcohol, especially ethyl alcohol, has been found essential for carrying out the separation process. By this addition the small amounts of 1.5-dibenzoyldiamino-anthraquinone, having been formed simultaneously with the monobenzoyl compound, can be caused to separate, and from the filtrate the 1 - benzoamino - 5 - aminoanthraquinone can easily be isolated in a state of purity, sufficient for using the compound as intermediate product in the manufacture of dyestuffs without any further cleaning.

The following example illustrates our invention without limiting it thereto, the parts being by weight.

*Example.*—To a mixture of 100 parts of 1.4-diaminoanthraquinone and 500 parts of nitrobenzene, 135 parts of collidine are added and the mixture is heated to about 145–150° C., until all water has escaped. After quickly cooling to 15–20° C. 80 parts of benzoylchloride, dissolved in 100 parts of nitrobenzene are gradually added, care being taken that the temperature does not surmount 25° C. After the addition of the benzoylchloride the temperature is maintained at about 30° C., until no more unchanged starting material is to be detected microscopically. The reaction product separates during the reaction and can be isolated by filtering.

When working in this manner, the 1-benzoyl-amino-4-aminoanthraquinone of the formula:

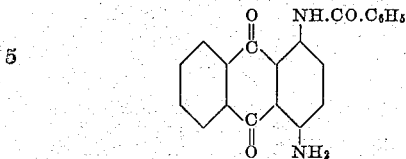

is obtained in a good yield and in a good state of purity. It is soluble in pyridine and sulfuric acid of 96% strength with a reddish-violet coloration and crystallizes from nitrobenzene in blue-black crystals.

This is a division of our co-pending application Serial No. 321,034, filed November 21, 1928.

We claim:—

1. Process for preparing 1-benzoylamino-4-aminoanthraquinone, which consists in slowly adding, while stirring, benzoylchloride in a quantity corresponding to 120–140% of the theoretical amount, to a mixture of 1.4-diaminoanthraquinone, a high boiling organic solvent being inert to the starting materials and of an acid binding medium, while maintaining the temperature between about 10–50° C.

2. Process for preparing 1-benzoylamino-4-aminoanthraquinone, which consists in slowly adding, while stirring, benzoylchloride in a quantity corresponding to 120–140% of the theoretical amount, to a mixture of 1.4-diaminoanthraquinone, an organic solvent of the group consisting of nitrobenzene and ortho-dichlorobenzene, and of an acid binding medium of the group consisting of sodium carbonate, pyridine and its homologues, in an amount at least sufficient to bind all of the hydrochloric acid being liberated during the reaction, at a temperature of between about 10–50° C.

3. Process which consists in heating a mixture of 100 parts by weight of 1.4-diaminoanthraquinone, 500 parts by weight of nitrobenzene and 135 parts by weight of collidine to about 145–150° C. until all water has escaped, quickly cooling the mixture to 15–20° C., slowly adding, while stirring, a mixture of 80 parts by weight of benzoylchloride and 100 parts by weight of nitrobenzene, care being taken that the temperature does not surmount 25° C., and heating the mixture after the addition of the benzoylchloride to about 30° C., until no more unchanged starting material is to be detected microscopically.

In testimony whereof, we affix our signatures.

HANS BUCHLOH.
WALTER MIEG.
WALTHER STOETZER.